No. 863,772. PATENTED AUG. 20, 1907.
A. T. BAUGH.
DISH DRIER AND DRAINER.
APPLICATION FILED JAN. 9, 1907.
2 SHEETS—SHEET 1.
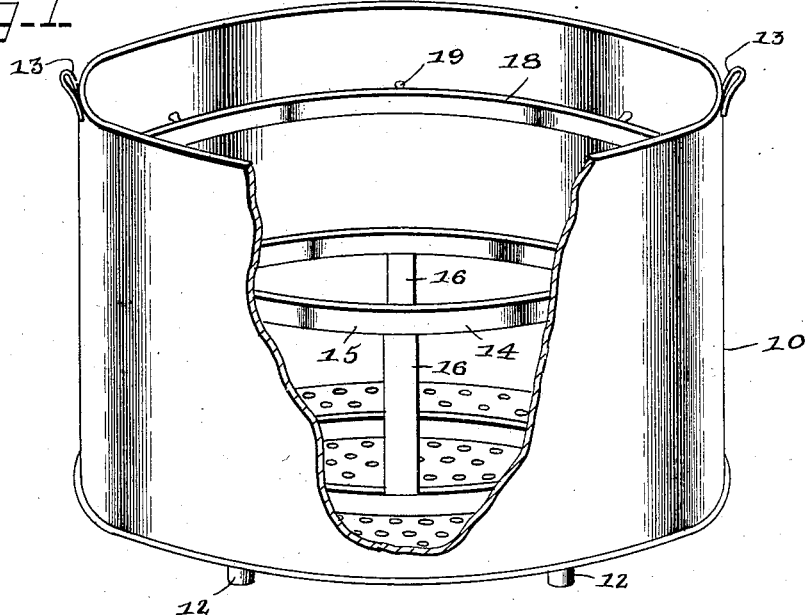
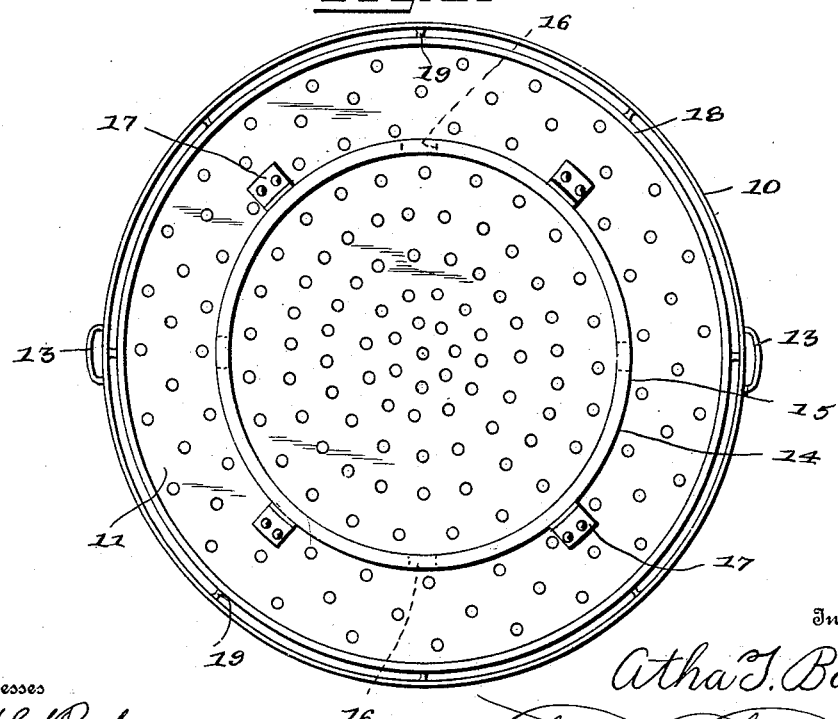

No. 863,772. PATENTED AUG. 20, 1907.
A. T. BAUGH.
DISH DRIER AND DRAINER.
APPLICATION FILED JAN. 9, 1907.

2 SHEETS—SHEET 2.

Witnesses
W. H. Rockwell
R. Baudt

Inventor
Atha T. Baugh
By Chandler & Chandler
Attorneys

UNITED STATES PATENT OFFICE.

ATHA T. BAUGH, OF PULASKI, TENNESSEE.

DISH DRIER AND DRAINER.

No. 863,772.

Specification of Letters Patent.

Patented Aug. 20, 1907.

Application filed January 9, 1907. Serial No. 351,499.

*To all whom it may concern:*

Be it known that I, ATHA T. BAUGH, a citizen of the United States, residing at Pulaski, in the county of Giles, State of Tennessee, have invented certain new and useful Improvements in Dish Driers and Drainers; and I do hereby declare the following to be a full, clear, and exact description of the invention, such as will enable others skilled in the art to which it appertains to make and use the same.

This invention has relation to that class of culinary articles that are employed in rinsing, draining and drying dishes, and other articles of table use.

The invention consists of improvements in means designed especially for the rinsing, draining and drying dishes and other articles and comprises a substantial outer vessel made of tin or other sheet metal having a foraminous bottom, and an open circular loose rack arranged centrally in the vessel on its bottom, and a ring pinned to the inner side of the vessel below the upper edge, providing between itself and the inner side of the vessel a rack for the reception of knives, forks, spoons and similar articles.

The nature of the invention is fully ascertainable from the annexed drawings, forming a part of this specification, in view of which the improvements will first be described with respect to their construction and mode of use, and then be pointed out in the subjoined claim.

Figure 3:
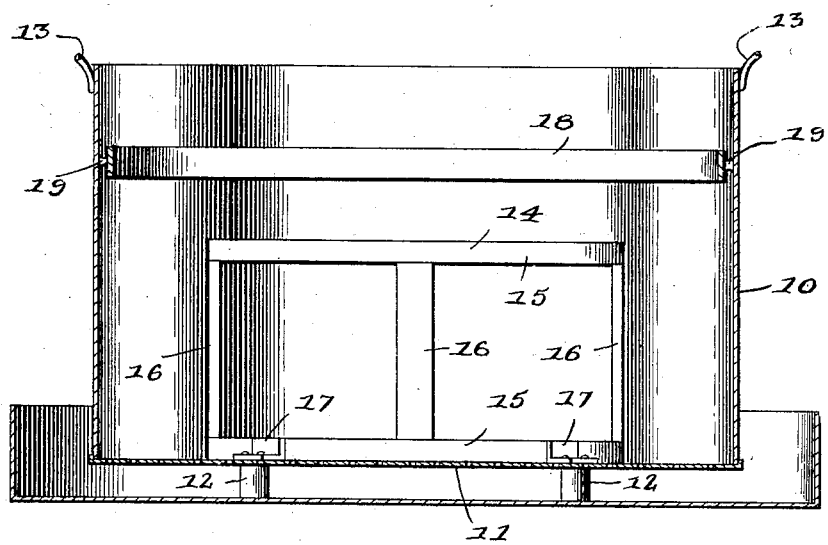
Figure 4:
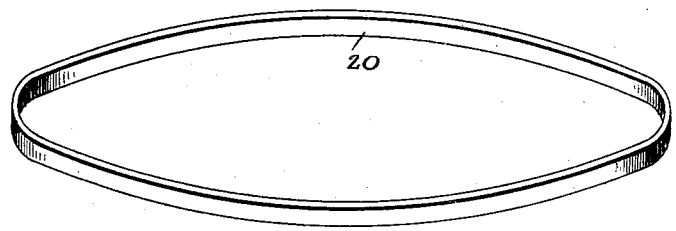

Of the said drawings—Figure 1 is a perspective view of the invention, part of the side being represented as broken away to show the interior. Fig. 2 is a top view. Fig. 3 is a vertical section. Fig. 4 is a ring of sheet metal hereinafter alluded to.

Similar numerals of reference designate similar parts or features, as the case may be, wherever they occur.

In the drawings, 10 designates a circular vessel of suitable dimensions, composed of tin or other sheet metal and having a foraminous bottom 11 to the lower surface of which there are connected short legs 12 that support the bottom of the vessel above the top of a stove, an oven floor or in a pan in which the vessel may be placed while the dishes drain or are being rinsed. On opposite sides of the upper edge of the vessel 10 it has ears 13 attached to it to enable it to be conveniently handled and carried about as may be desired.

14 designates a circular rack composed of a plurality of rings 15 connected by vertical uprights 16. The lowermost ring rests on the bottom of the vessel and is held in place laterally by angular brackets 17 one part of which is secured to the bottom of the vessel, the other part standing upright against the outside of the bottom ring of the rack.

18 designates a ring of metal pinned at intervals, as at 19, or otherwise secured to the inner side of the vessel below its upper edge to afford a rack between the said ring 18 and the upper edge of the vessel for holding spoons, knives, and forks, and similar articles to be dried.

In use, the dishes when washed will be placed in the rack 14 so that water may drain therefrom when set on edge or in inclined position on the said rack, while articles like knives, forks and spoons may be arranged in the rack between the ring 18 and the side of the vessel.

After the dishes and other articles may have been washed and placed in the drainer and drier, they may have clear hot water poured over them for rinsing purposes and the drier containing the dishes set out of doors or in an oven, or on a stove or other place to dry, no rubbing with a dry cloth for polishing being necessary, excepting it may be, on glassware.

When the vessel containing dishes to be dried is placed out of doors, in case a hot sun is shining, it may be set in a pan or other article and a cloth thrown over the dishes and top of the vessel to keep flies and other insects away from the same, as well as to protect the dishes from dust settling thereon, and the ring 20, shown on Fig. 4 may be passed over the said covering cloth and down over the sides of the vessel to keep the cloth in place. The ring, however, is not essential since other means may be employed, if necessary, to keep the covering cloth in place.

It is proposed to use no solder in the construction of devices, that may be liable to melt in the drying operation.

As stated the inner circular rack will be formed in any suitable way to keep it in place in the vessel, and the ring 18 may extend but part way around inside of the upper edge, if desired, thus giving a greater extent of space for the accommodation of dishes.

What is claimed is—

A rinser, drainer and drier for dishes and other articles of table use, consisting of a vessel composed of sheet metal having a foraminous bottom, and legs secured to the bottom, a circular rack supported within the vessel and disposed centrally therein, brackets engaging the bottom of the rack to keep the same in place, and a ring secured to the upper inner side of the vessel affording a rack for the support of knives, forks, spoons and other similar articles.

In testimony whereof, I affix my signature, in presence of two witnesses.

ATHA T. BAUGH.

Witnesses:
 HATCHER GRIGSLY,
 J. C. OAKES.